US 6,503,092 B1

(12) United States Patent
Sato

(10) Patent No.: US 6,503,092 B1
(45) Date of Patent: Jan. 7, 2003

(54) CARD CONNECTOR

(75) Inventor: Shigeru Sato, Chiba (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/914,322

(22) PCT Filed: Dec. 27, 2000

(86) PCT No.: PCT/JP00/09285
§ 371 (c)(1),
(2), (4) Date: Aug. 27, 2001

(87) PCT Pub. No.: WO01/48871
PCT Pub. Date: Jul. 5, 2001

(30) Foreign Application Priority Data

Dec. 28, 1999 (JP) .......................................... 11-373937

(51) Int. Cl.⁷ .............................................. H01R 13/62
(52) U.S. Cl. ..................................... 439/159; 439/630
(58) Field of Search ................................ 439/159, 160, 439/372, 157, 630

(56) References Cited

U.S. PATENT DOCUMENTS

| 5,033,972 A | | 7/1991 | Komatsu et al. | |
|---|---|---|---|---|
| 5,145,389 A | | 9/1992 | Okubo | |
| 5,197,894 A | | 3/1993 | Koike | |
| 5,286,207 A | * | 2/1994 | McHugh | 439/159 |
| 5,492,480 A | | 2/1996 | Fusselman et al. | |
| 5,492,481 A | * | 2/1996 | Lewis | 361/754 |
| 5,533,906 A | * | 7/1996 | Abe | 439/157 |
| 5,648,651 A | | 7/1997 | Inoue | |
| 5,655,918 A | | 8/1997 | Soh | |
| 5,674,080 A | | 10/1997 | Takemura | |
| 5,695,351 A | | 12/1997 | Kimura et al. | |
| 5,725,385 A | * | 3/1998 | Takano et al. | 439/541.5 |
| 5,740,012 A | | 4/1998 | Choi | |
| 5,890,920 A | * | 4/1999 | David et al. | 439/157 |

(List continued on next page.)

FOREIGN PATENT DOCUMENTS

| JP | 2000-251024 | 9/2000 |
|---|---|---|
| JP | 2000-251025 | 9/2000 |
| JP | 2000-277207 | 10/2000 |

OTHER PUBLICATIONS

U.S. patent application Ser. No. 09/978,660, Sato, filed Oct. 18, 2001.
U.S. patent application Ser. No. 09/978,661, Sato, filed Oct. 18, 2001.
U.S. patent application Ser. No. 10/067,404, Ooya et al., filed Feb. 7, 2002.
U.S. patent application Ser. No. 10/090,153, Ito et al., filed Mar. 5, 2002.
U.S. patent application Ser. No. 10/102,826, Sato et al., filed Mar. 22, 2002.
U.S. patent application Ser. No. 10.102,928, Abe, filed Mar. 22, 2002.
U.S. patent application Ser. No. 09/832190, Takada et al., filed Apr. 11, 2001.

Primary Examiner—Tho D. Ta
Assistant Examiner—Edwin A. León
(74) Attorney, Agent, or Firm—Finnegan, Henderson, Farabow, Garrett & Dunner, L.L.P.

(57) ABSTRACT

The stopper portion that blocks the movement of the ejection member in the card ejection direction is disposed at the position which met in the width direction of card connector, and is in the position of the same side as the position with the elastic body 60 which urges the ejection member in the card ejection direction. This arrangement can hold the attitude of the ejection member straight relative to the connector, thus preventing troubles such as an inadvertent unlocking of the eject lock and an unstable contact between the contact pads of the card and the contact terminals of the connector.

5 Claims, 5 Drawing Sheets

U.S. PATENT DOCUMENTS

| | | | |
|---|---|---|---|
| 5,899,763 A | 5/1999 | Kajiura | |
| 5,923,541 A | 7/1999 | Yasumi | |
| 5,967,810 A | 10/1999 | Spickler et al. | |
| 6,065,984 A | 5/2000 | Tung | |
| 6,083,018 A * | 7/2000 | Hara et al. | 439/159 |
| 6,095,834 A | 8/2000 | Lai et al. | |
| 6,106,313 A | 8/2000 | Chen | |
| 6,120,309 A * | 9/2000 | Hara | 439/157 |
| 6,139,340 A | 10/2000 | Niitsu | |
| 6,152,748 A * | 11/2000 | Sato et al. | 439/159 |
| 6,159,027 A | 12/2000 | Kuo | |
| 6,162,075 A * | 12/2000 | Hara et al. | 439/159 |
| 6,174,197 B1 * | 1/2001 | Hirata et al. | 439/541.5 |
| 6,200,148 B1 | 3/2001 | Yu | |
| 6,210,187 B1 | 4/2001 | Tung | |
| 6,227,879 B1 * | 5/2001 | Dong | 439/159 |
| 6,231,360 B1 * | 5/2001 | Horie | 439/159 |
| 6,234,813 B1 | 5/2001 | Hanyu | |
| 6,270,365 B1 | 8/2001 | Nishioka | |
| 6,273,737 B1 * | 8/2001 | Furusho et al. | 439/159 |
| 6,290,136 B1 * | 9/2001 | Koseki et al. | 235/475 |
| 6,299,465 B1 | 10/2001 | Hirata | |
| 6,302,715 B1 * | 10/2001 | Sato et al. | 439/159 |
| 6,319,029 B2 * | 11/2001 | Nishioka | 439/159 |
| 6,332,790 B1 | 12/2001 | Ishikawa et al. | |
| 6,390,836 B1 | 5/2002 | Motegi et al. | |
| 6,394,827 B2 | 5/2002 | Nogami | |
| 6,398,567 B1 | 6/2002 | Nishimura | |
| 6,398,827 B1 | 6/2002 | Ota et al. | |

* cited by examiner

CARD CONNECTOR

TECHNICAL FIELD

The present invention relates to a card connector mounted on electronic devices, such as cellular phones, telephones, PDA (personal digital assistant), portable audio devices and digital cameras, and more specifically to a structure of the card connector for ejecting a card.

BACKGROUND ART

In electronic devices such as cellular phones, telephones, PDA and digital cameras, a variety of functions are added by loading an IC card with a built-in IC (integrated circuit) like control circuit, memory, such as a SIM (subscriber identity module), an MMC (multimedia card)(trademark), a Smart Media (trademark) and an SD (secure digital or super density) card.

In a connector structure for removably accommodating such an IC card, a plurality of contact terminals made from a resilient metal leaf are provided in a connector housing to make contact with a plurality of contact pads formed on the front or back surface of the loaded IC card to electrically connect the IC card to the electronic device mounting that connector. The contact pads of the IC card include a power supplying pad connected to a power supply line and a plurality of signal pads for transmitting and receiving various signals. These contact pads are connected via the contact terminals of the card connector to a power circuit and various signal processing circuits in the electronic device.

Many of such card connectors have an ejection mechanism for ejecting a loaded IC card from the connector.

An ejection mechanism of this kind currently available is known to have an ejection member urged in an ejection direction to eject a IC card, a locking member for blocking the movement of the ejection member in the eject direction, and an ejection button member to release the locking member to allow the ejection member to move and eject the card. An example of such a prior art is shown in FIG. 5.

In FIG. 5, the ejection member 100 is configured to slide relative to the connector body in a card insertion direction A and a card ejection direction B and is urged in the ejection direction B by a coil spring 102. An engagement portion 101 adapted to engage the locking member 110 is arranged in the vicinity of the locking member 110 made from a leaf spring so that the locking member 110 can lock the ejection member 100. A connecting portion 104 is arranged to connect between the engagement portion 101 and the ejection member 100 and formed integral with the engagement portion 101 and the ejection member 100. The locking member 110 has a lock hole for latching together the engagement portion 101 to block the movement of the ejection member 100 in the ejection direction B. A tapered surface 121 is formed at its front end side of the ejection button 120 tapered surface, and comes in contact with the front end of the locking member 110. 130 denotes a brake shoeshoe made from a leaf spring to prevent the card from slipping off. 140 designates ends of two contact pieces that constitute a card recognition switch. These two contact pieces are configured to contact each other by one of them being vertically displaced by a downward pressing force of the underside of a side edge portion 100a of ejection member 100.

In the conventional structure described above, pressing operation of the ejection button 120 displaces the locking member 110 in a direction D by the pressing force of the tapered surface 121, disengaging the engagement portion 101 from the locking member 110. The ejection member 100 therefore is moved in the ejection direction B by the spring force of the coil spring 102, while ejecting the loaded card out of the connector.

In many cases, the card connector of this kind is often required to reduce its size and height, which necessitates various parts of the connector to be laid out efficiently in a small space.

To satisfy this requirement, rather than arranging the ejection member 100 and the ejection button 120 on the one side of the card accommodating space, it is advantageous to place them on the both sides of the card accommodating space respectively as shown in FIG. 5 because this arrangement allows various parts to be laid out efficiently.

With this prior art, however, the engagement portion 101 is extended by the connecting portion 104 to a position of the ejection button 120 located on a side of the card accommodating space opposite the ejection member 100 so that the movement of the ejection member 100 is restricted at a position on the ejection button 120 side. Thus, the locations of the coil spring 102 urging the ejection member 100 and the engagement portion 101 are largely spaced apart along the width direction. In this prior art, accordingly, the ejection member 100 in itself is acted upon by an angular moment, so ejection member 100 is tilted, giving rise to various problems, such as the locking member 110 being easily unlocked, the electric connection between the IC card and the connector becoming unstable, and the card recognition switch 140 turning off when the card is loaded.

The present invention has been accomplished under these circumstances and it is an object of the present invention to provide a card connector that can prevent the tilting of the ejection member and support the card straight relative to the connector in which it is accommodated.

DISCLOSURE OF THE INVENTION

According to one aspect, the present invention provides a card connector which comprises: a connector housing having a card accommodating portion and removably supporting a card; an ejection member having an touch portion for coming in contact with a front end face of the card, the ejection member being slidable relative to the connector housing in a card insertion direction and in a card ejection direction; an elastic body urging the ejection member in the card ejection direction; an ejection button disposed in an opposite side to the elastic body on both sides of the card accommodating portion; and a stopper locking means having a stopper portion, the stopper portion being disposed in an opposite side to ejection button on both sides of the card accommodating portion to regulate the movement of the ejection member in the card ejection direction, wherein when the ejection button is depressed, the stopper portion is made to move to an unlocking position to free the ejection member and when the ejection button is released from the depressing operation, the stopper portion is made to move toward a blocking position where it blocks the movement of the ejection member in the card ejection direction.

The stopper locking means has, for example, a leaf spring portion for generating an elastic force acting in a direction perpendicular to the card insertion direction and a slide portion connecting the leaf spring portion and the stopper portion and moving the stopper portion in a direction perpendicular to the card insertion direction. These stopper portion, the leaf spring portion and the slide portion are integrally formed as one piece.

In this invention, the stopper portion that blocks the movement of the ejection member in the card ejection direction is arranged in an opposite side to the ejection button on both sides of the card accommodating portion opposite, i.e., ejection member is disposed at the position which met in the width direction of card connector, and is in the position of the same side as the position with the elastic body which urges the ejection member in the card ejection direction.

This arrangement produces no angular moment acting on the ejection member, which in turn allows the ejection member to align its attitude straight with the connector. It is therefore possible to prevent troubles, such as the contact between the contact pads and the contact terminals becoming unstable, the eject lock inadvertently getting unlocked, and the card recognition switch undesirably being operated.

BEST MODE FOR CARRYING OUT THE INVENTION

Now, an embodiment of the present invention will be described in detail by referring to the accompanying drawings.

Figure 1:
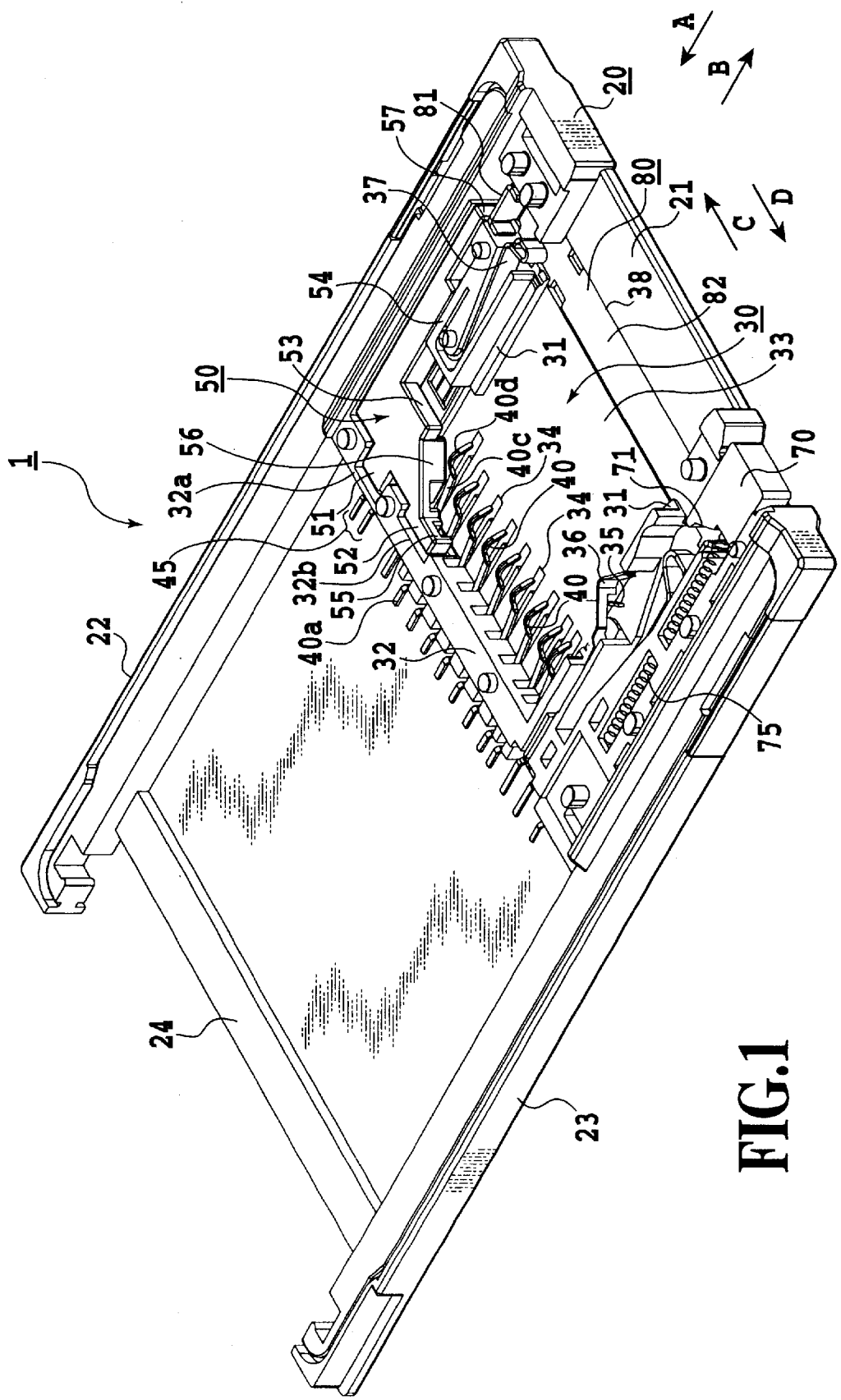
FIG. 1 is a perspective view showing an internal construction of the card connector according to one embodiment of the present invention.
Figure 2:
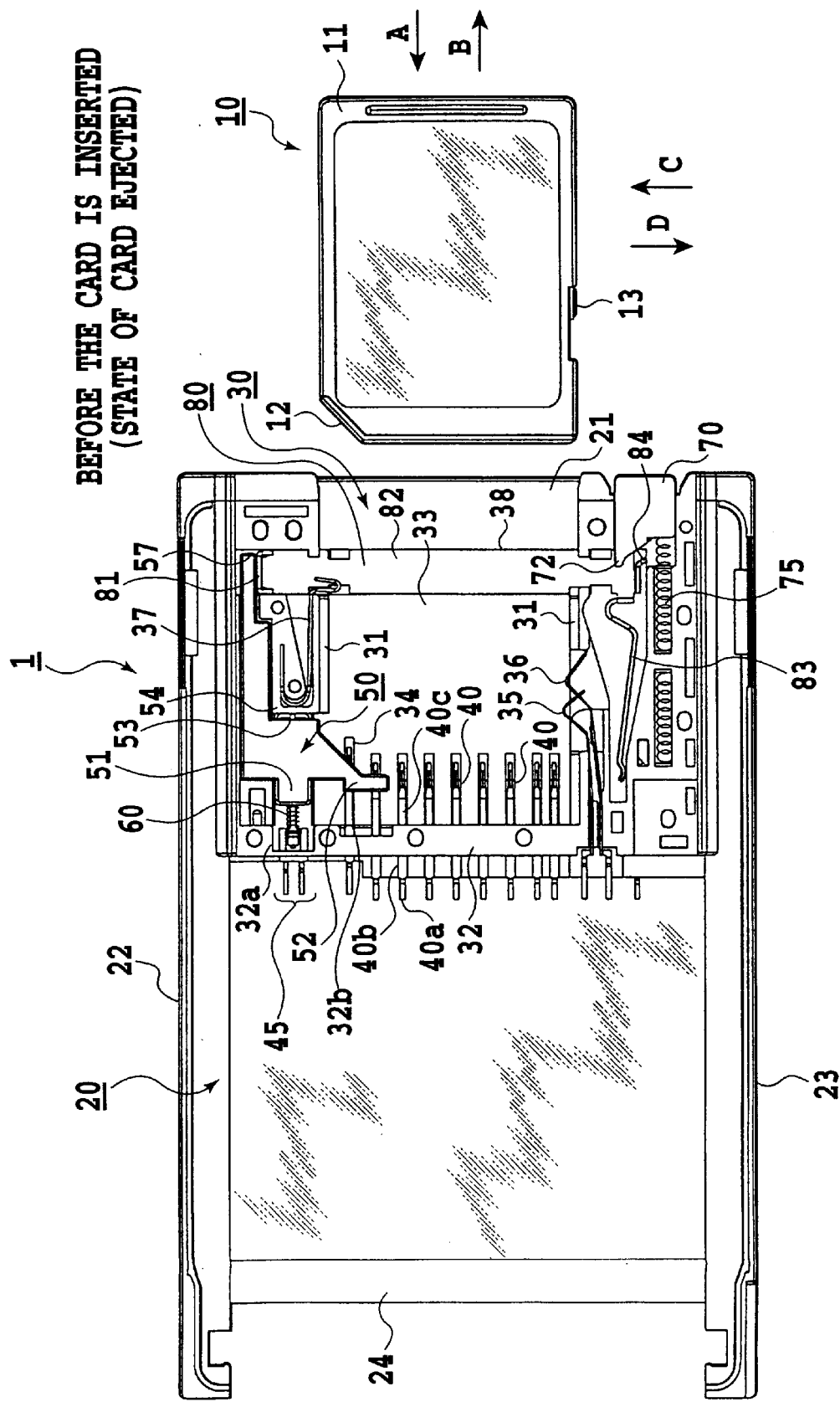
FIG. 2 is a plan view showing the state of the card connector expressed in FIG. 1 before a card is inserted.
Figure 3:
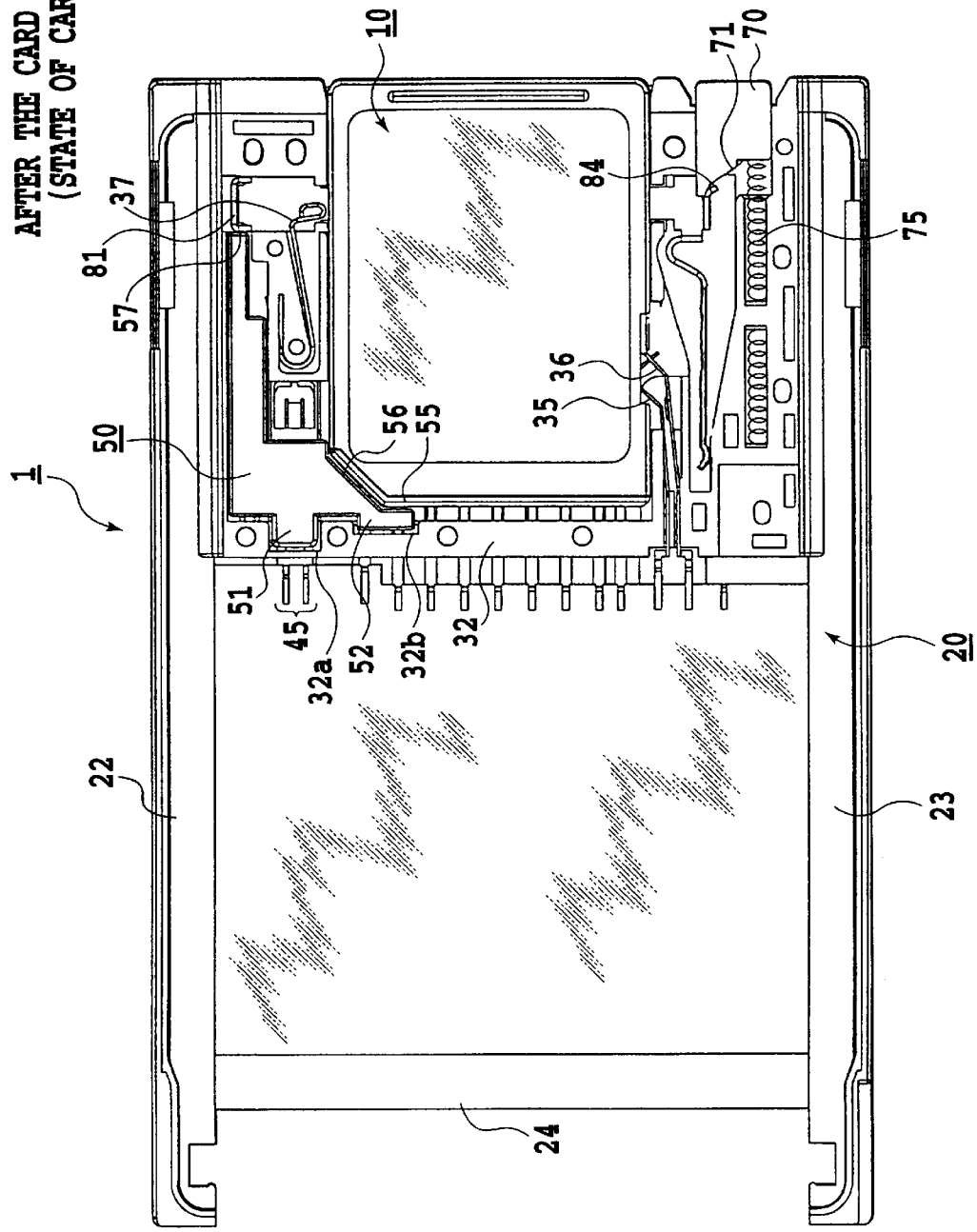
FIG. 3 is a plan view showing the state of the card connector expressed in FIG. 1 after the card is inserted.
Figure 4:
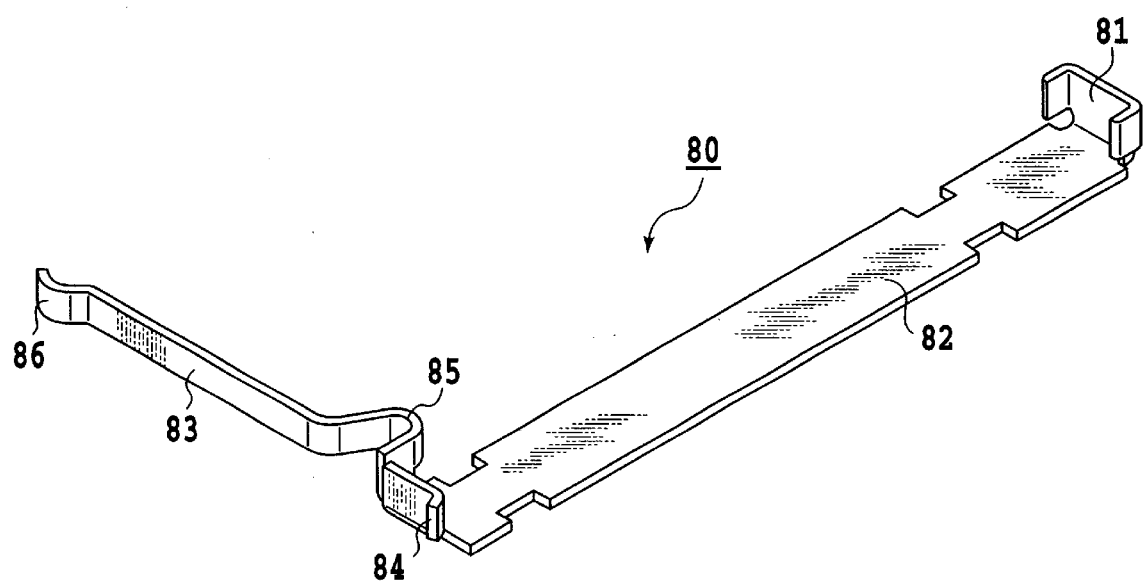
FIG. 4 is a perspective view showing a stopper locking member used in the card connector of FIG. 1.
Figure 5:
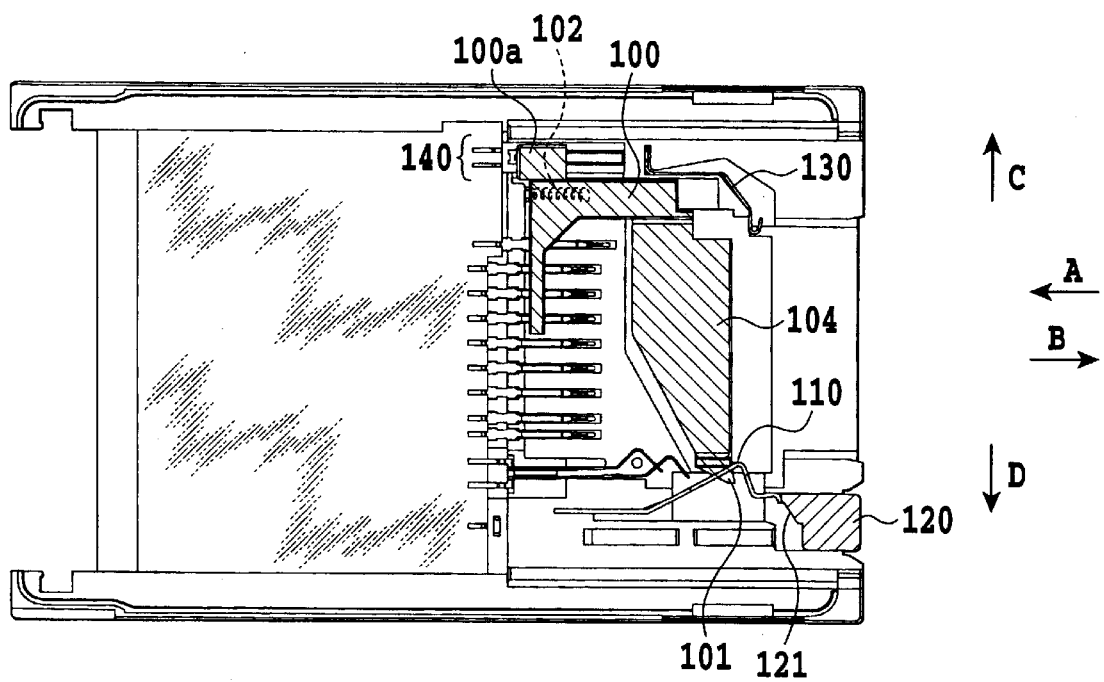
FIG. 5 is a plan view showing a conventional card connector.

FIG. 1 is a perspective view showing the internal construction of the card connector. FIG. 2 is a plan view showing the state of the card connector before a card is inserted. FIG. 3 is a plan view showing the state of the card connector after the card is inserted. FIG. 4 is a perspective view showing an example of a stopper locking member.

This card connector 1 is mounted on electronic devices such as cellular phones, PDA, portable audio devices and digital cameras.

As shown in FIG. 2 and FIG. 3, the IC card 10 has a cutout portion 12 at its right front end portion of its body portion 11 to prevent an erroneous insertion of the card. On the back surface of the body portion 11 are arranged a plurality of metallic contact pads (not shown) that are electrically connected to an integrated circuit (IC) built into the card. On one side surface of the IC card 10 is arranged a slidable write protect button 13 which, when slid to one position, inhibits data writing into the card 10.

In FIGS. 1 to 3, the card connector 1 has a connector housing 20 molded from an insulating material such as resin. When a cover is needed, the housing may be formed integral with the cover, or the cover may be provided separately from the housing 20.

The IC card 10 is inserted into the card connector 1 through a card insertion opening 21 formed at the front of the housing 20.

The housing 20 comprises mainly a pair of side wall portions 22, 23, a card accommodating portion 30, a cross-plate portion 24 and a lower plate 33. A pair of guide rails 31 for guiding and supporting the card 10 is formed in the card accommodating portion 30. The card 10 is guided at its both side edges by the guide rails 31 as it is moved in the card insertion direction A and the card ejection direction B.

The card accommodating portion 30 is also formed with an abutment wall 32 against which the front-end of the inserted IC card 10 is pushed.

A plurality of press-fit grooves 34 for positioning and securing a plurality of contact terminals 40 is formed in the lower plate 33 constituting a bottom wall of the card accommodating portion 30.

The contact terminals 40 include a power supply terminal and signal terminals. Each of the contact terminals 40 has a terminal portion 40a soldered to an associated contact pad on a printed circuit board of the electronic device, a fixed portion 40b rigidly held in the press-fit groove 34, and a contact spring portion 40c elastically displaced to come in contact with the contact pad of the card 10. The contact spring portion 40c has a contact portion 40d projecting from the lower plate 33 in an arc.

These contact terminals 40 make electrical connection between the card 10 and the electronic device through their contact between a plurality of contact terminals 40 and the contact pads of the card 10 and at the same time provide an appropriate card holding force by their elastic force when the card is loaded.

At one side portion of the card accommodating portion 30, there is provided a write protect switch made up of a pair of spring-contact pieces 35, 36. These paired spring-contact pieces 35, 36 separably contact according to the slide position of the write protect button 13 on the card 10. By electrically detecting the state of the separably contacting the position of the write protect button 13 is detected.

At the other side portion of the card accommodating portion 30 there is provided a brake shoe 37 made from a leaf spring which prevents a card from falling off. 45 denotes terminal portions of two contact pieces that constitute a card recognition switch for detecting the presence or absence of the card loading in the card connector. These two contact pieces are made to contact each other by one of them being vertically displaced by a downward pressing force of the underside of a projecting portion 51 of an ejection member 50 described later.

Next, the construction for card ejection, the essential part of the present invention, will be described.

The card ejection mechanism comprises an ejection member 50, an ejection spring 60 as an elastic body (see FIG. 2), an ejection button 70, a button spring 75, and a stopper locking member 80.

The ejection member 50 is nearly L-shaped and is configured to slide over a predetermined range in the card insertion direction A and the card ejection direction B. The slide range of the ejection member 50 is set between a position where protruding portions 51, 52 of the ejection member 50 fit in and touch recessed portions 32a, 32b formed in the abutment wall 32 (see FIG. 1 and FIG. 3) and another position where an abutment wall 53 of the ejection member 50c comes in contact with a stopper body 54 enclosing the brake shoe 37 (see FIG. 2). The ejection member 50 is urged in the ejection direction B by the ejection spring 60, an elastic body (coil spring) inserted over a pin (see FIG. 2).

The ejection member 50 has a card touch portion 55 which the front end of the card 10 comes in contact with and a corner wall 56 which the cutout portion 12 of the card 10 comes in contact with. When the card is inserted, the ejection member 50 is slid in the card insertion direction A by the pushing force of the card 10.

A forefront end portion, on the near side, of the ejection member 50 functions as a stopper touch portion 57 that comes in contact with a stopper portion 81 of the stopper locking member 80 described later.

The ejection button 70 is arranged in an opposite side to the ejection spring 60 urging the ejection member 50 on both sides of the card accommodating portion.

The ejection button 70 is mounted in the connector housing 20 in such a manner that it is slidable in the card insertion direction A and card ejection direction B by a distance equal to a stroke of its eject operation. The ejection button 70 is urged toward the near side (retraction direction) of the card connector 1 at all times by a button spring 75 that constructed of a coil spring. The tapered surface 71 is formed at its front end side of the ejection button 70, comes in contact with a tapered surface touch portion 84 formed at the front end (on the near side) of the leaf spring portion of the stopper locking member 80.

The stopper locking member 80, as detailed in FIG. 4, is integrally formed in one piece by an approximately L-shaped metal material.

The stopper locking member 80 has: a slide portion 82 slidably installed in a guide groove 38 extending along width direction, formed in the lower plate 33 of the card accommodating portion 30; a cross-sectional rectangle-like stopper portion 81 erected at a free end of the slide portion 82; a leaf spring portion 83 for moving the slide portion 82 in the direction of arrow C by its elastic recovering force; a tapered surface engagement portion 84 touching the tapered surface 71 of the ejection button 70; a protruding portion 85 working as a stopper for a taper portion end 72 of the ejection button 70 (see FIG. 2); and an end portion 86 for supporting the leaf spring portion 83 at one point.

In this construction, the stopper portion 81 for regulating the movement of the ejection member 50 in the ejection direction, is arranged in the side in the connector housing, and is the same side on which the ejection spring 60 is arranged in the connector housing. In this embodiment, the position of the stopper portion 81's width direction is set at almost the same position as the axis of the ejection spring 60.

Next, the operation of the card connector 1 when the card is inserted and ejected will be described.

(Operation When Card Is Inserted)

Before the card is inserted, the ejection member 50 is urged by the ejection spring 60 so that it assumes a near-side position where the abutment wall 53 comes in contact with the stopper body 54, as shown FIG. 2. In this state, the stopper touch portion 57 of the ejection member 50 is at an advanced position in the guide groove 38 formed in the lower plate 33, while the stopper portion 81 of the stopper locking member 80 touching the side face of the stopper touch portion 57. Hence, at this time the slide portion 82 of the stopper locking member 80 is displaced in a direction D and accordingly, the leaf spring portion 83 is also elastically displaced.

In this state, when the IC card 10 is inserted into the connector 1, the front wall and the cutout corner portion 12 of the card 10 press against the card touch portion 55 and the corner wall 56 of the ejection member 50, accordingly, the ejection member 50 is made to slide in the card insertion direction A against the force of the ejection spring 60. When the card 10 is fully inserted in the connector 1, the side face of the stopper touch portion 57 of the ejection member 50 disengages from the stopper portion 81, allowing the slide portion 82 of the stopper locking member 80 to slide in the guide groove 38 in the direction of arrow C by the recovering action of the leaf spring portion 83. As a result, the stopper portion 81 of the stopper locking member 80 moves to a position where it blocks the return of the ejection member 50. The movement of the ejection member 50 in the card ejection direction B is regurated.

When the card 10 is inserted, the ejection button 70 is urged by the button spring 75 to be situated at a position not influenced by the movement of the stopper locking member 80.

The card 10 is loaded into the connector 1 as described above.

(Operation When the Card Is Ejected)

When, with the IC card 10 loaded, the ejection button 70 is depressed, the tapered surface 71 of the ejection button 70 pushes the tapered surface engagement portion 84 of the stopper locking member 80. This causes the slide portion 82 of the stopper locking member 80 to move in the direction of arrow D, or in the unlocking direction, and the leaf spring portion 83 to be elastically displaced in the direction of arrow D. As a result, the stopper portion 81 of the stopper locking member 80 moves to the unlocking position, disengaging the stopper portion 81 from the stopper touch portion 57 of the ejection member 50, with the result that the ejection member 50 is made to move in the card ejection direction B by the urging force of the ejection spring 60, thus ejecting the card 10. The ejection button 70, when it is released from the depressing force, is automatically returned to the original position by the force of the button spring 75.

As described above, in this card connector in which the ejection button 70 is in an opposite side to the ejection member 50 and ejection spring 60 on both sides of the card accommodating portion 30, the stopper portion 81 that blocks the movement of the card ejection direction B of the ejection member 50 is arranged at a position which met in the width direction of the card connector, and is the position of the same side as a position with the ejection spring 60 which urges the ejection member 50 in the card ejection direction, i.e., the stopper portion 81 is arranged in an opposite side to ejection button 70 on both side of the card accommodating portion 30. Therefore, the distance which met in the width direction between the stopper portion 81 and the ejection spring 60 is short, so that no angular moment acts on the ejection member 50 as it would in the conventional construction, allowing the ejection member 50 to align its attitude straight with the connector. Hence, it is possible to prevent troubles, including the contact between the contact pads of the card 10 and the contact terminals 40 of the connector 1 becoming unstable, the eject lock inadvertently getting unlocked, and the card recognition switch undesirably being operated.

In this embodiment, the ejection member 50 is arranged in an opposite side to the write protect switch on both sides of the card accommodating portion 30 and this arrangement makes it possible to put various components efficiently and easily.

Although in the embodiment above the integrally formed stopper locking member 80 is used to enable or disable the blocking of the movement of the ejection member 50 in the card ejection direction according to the depressing operation of the ejection button 70, any other arbitrary construction may be used to achieve the above function as long as the stopper portion 81 is situated at a position which met in the width direction of card connector, and is in the position of the same side as a position with ejection spring 60.

Further, in the embodiment above, the ejection spring 60 or the button spring 75 are not limited to the coil spring but may use any other kind of spring or any arbitrary elastic body.

What is claimed is:

1. A card connector for inserting and ejecting a card, comprising:

an ejection member configured to slide in a card insertion direction and a card ejection direction;

an elastic body for urging said ejection member in said card ejection direction, wherein the elastic body is located on a first side of the card connector and wherein the first side of the card connector is a side of the card connector extending in a card insertion/ejection direction;

an ejection button located on a second side of the card connector, wherein the second side of the card connector is a side of the card connector opposite the first side and extending in a card insertion/ejection direction; and a stopper locking means for regulating movement of the ejection member, wherein:

the stopper locking means comprises a stopper portion located on the first side of the card connector, wherein the stopper portion is configured to move to an unlocking position to free said ejection member to move in a card ejection direction when the ejection button is depressed and configured to move to a blocking position to block the movement of said ejection member in said card ejection direction when the ejection button is released from said depressed operation; and the stopper locking means comprises a leaf spring portion for generating an elastic force acting in a direction perpendicular to said card insertion direction and a slide portion connecting said leaf spring portion and said stopper portion and moving said stopper portion in a direction perpendicular to said card insertion direction, and wherein said stopper portion, said leaf spring portion and said slide portion are integrally formed as one piece.

2. The card connector according to claim 1, wherein said stopper portion and said elastic body are disposed at almost the same position with respect to a width direction of said card connector.

3. The card connector according to claim 1, wherein said ejection button has a tapered surface to move said slide portion causing said stopper portion to move to said unlocking position by a pressing force of said tapered surface.

4. The card connector according to claim 1, further comprising an automatic resetting mechanism for automatically resetting said ejection button.

5. The card connector according to claim 1, wherein a write protect detection switch for detecting a position of a write protect button on said card is located on a side opposite a side said ejection member is located.

* * * * *